(12) United States Patent
Larsen et al.

(10) Patent No.: US 10,583,567 B1
(45) Date of Patent: Mar. 10, 2020

(54) ADAPTIVE BUNDLE GRIPPING END EFFECTOR WITH OPENING JAW

(71) Applicant: The Boeing Company, Chicago, IL (US)

(72) Inventors: Ty A. Larsen, Everett, WA (US); Lars Blacken, Bothel, WA (US); Keith Cutler, Kirkland, WA (US)

( * ) Notice: Subject to any disclaimer, the term of this patent is extended or adjusted under 35 U.S.C. 154(b) by 0 days.

(21) Appl. No.: 16/363,837

(22) Filed: Mar. 25, 2019

(51) Int. Cl.
  *B66C 1/16* (2006.01)
  *B25J 15/02* (2006.01)
  *B25J 9/12* (2006.01)

(52) U.S. Cl.
  CPC .............. *B25J 15/02* (2013.01); *B25J 9/126* (2013.01)

(58) Field of Classification Search
  CPC ......... B25J 15/02; B25J 9/126; B25J 15/0014
  USPC ................. 294/86.4, 103.1, 116; 198/403
  See application file for complete search history.

(56) References Cited

U.S. PATENT DOCUMENTS

| | | | | |
|---|---|---|---|---|
| 3,970,342 A * | 7/1976 | Cotton | ............... | B66F 9/183 294/86.4 |
| 4,545,723 A * | 10/1985 | Clark | ............... | B25J 15/04 294/86.4 |
| 4,570,431 A * | 2/1986 | Igel | ............... | D01H 9/001 198/803.3 |
| 4,592,581 A * | 6/1986 | Howard | ............... | B66C 1/46 294/111 |
| 4,810,019 A * | 3/1989 | Brucher | ............... | B23Q 1/76 294/106 |
| 5,205,598 A * | 4/1993 | Miller | ............... | A63B 57/0037 294/19.2 |
| 5,330,177 A * | 7/1994 | Rogge | ............... | A63B 47/02 294/19.2 |
| 7,472,565 B1 * | 1/2009 | Heldoorn | ............... | B28B 3/00 269/268 |
| 8,833,823 B2 * | 9/2014 | Price | ............... | B66C 1/44 294/198 |

* cited by examiner

*Primary Examiner* — Paul T Chin
(74) *Attorney, Agent, or Firm* — Felix L. Fischer

(57) ABSTRACT

A bundle gripping tool has a support ring sector 12a extending from a handle 11 and a jaw 12b pivotally mounted to the handle opposing the support ring sector 12a. The jaw is rotatable from an open position to a closed position wherein the jaw 12b and support ring sector 12a form a circular support ring 12 concentric to a bundle axis 14. The jaw exposes a first open sector accessing a central aperture in the open position. A snare ring 22 is supported on the jaw 12b in the open position and rotatable on the support ring 12 in the closed position and has a second open sector 34 wherein in an unrotated position of the snare ring at least partially aligns the second open sector with the first open sector exposing the central aperture. A plurality of snare cables 40 are engaged between the support ring and the snare ring with a first set of attachment points and second set of attachment points relatively positioned whereby each of the plurality of snare cables partially encircles the bundle axis in the closed and rotated position and exposes the bundle axis in the unrotated and open position. An actuator 48 is configured to open and close the jaw and rotate the snare ring with the jaw in the closed position.

20 Claims, 18 Drawing Sheets

ADAPTIVE BUNDLE GRIPPING END EFFECTOR WITH OPENING JAW

REFERENCE TO RELATED APPLICATIONS

This application is copending with US application Ser. No. 16/363,771 filed substantially concurrently herewith entitled AN ADAPTIVE BUNDLE GRIPPING END EFFECTOR, the disclosure of which is incorporated herein by reference.

BACKGROUND INFORMATION

Field

Implementations shown in the disclosure relate generally to wire bundle gripping systems and more particularly to implementations for a bundle gripping tool having an opening jaw employing a support ring and a snare ring having open sectors aligned to receive a cable bundle and misaligned to constrain the cable bundle with snare cables engaged between the support ring and snare ring.

BACKGROUND

Bundling of wires in manufacturing operations for complex electronic and electromechanical system in products such as aircraft or other vehicles is highly labor intensive. Wires may be routed on looms or form-boards creating various harness arrangements that branch, coalesce and terminate in highly complex patterns. Bundling and tying of groups of wires is required to create the harnesses and maintain the orderly arrangement of the various bundles for attachment of connectors or insertion into electrical assemblies.

SUMMARY

Implementations disclosed herein provide a bundle gripping tool has a support ring sector extending from a handle and a jaw pivotally mounted to the handle opposing the support ring sector. The jaw is rotatable from an open position to a closed position wherein the jaw and support ring sector form a circular support ring concentric to a bundle axis. The jaw exposes a first open sector accessing a central aperture in the open position. A snare ring is supported on the jaw in the open position and rotatable on the support ring in the closed position and has a second open sector wherein in an unrotated position of the snare ring at least partially aligns the second open sector with the first open sector exposing the central aperture. A plurality of snare cables are engaged between the support ring and the snare ring with a first set of attachment points and second set of attachment points relatively positioned whereby each of the plurality of snare cables partially encircles the bundle axis in the closed and rotated position and exposes the bundle axis in the unrotated and open position. An actuator is configured to open and close the jaw and rotate the snare ring with the jaw in the closed position.

The implementations allow a method for handling of bundles wherein a bundle gripping tool having a support ring with a jaw and a rotatable snare ring is positioned with the jaw in an open position and the snare ring in an unrotated position exposing a central aperture through a first open sector of the support ring. A bundle axis is exposed in the open position with snare cables engaged at first ends at a first set of attachment points on the support ring and on second ends at a second set of attachment points on the snare ring. A bundle is inserted through the first open sector into the central aperture. The jaw is closed with an actuator to gate the central aperture and the snare ring rotated with the actuator through a range of rotation to a rotated position. Bights of the snare cables are transitioned with rotation of the snare ring to a concave configuration. The bundle axis and inserted bundle are partially encircled with the snare cables in the rotated position.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

Figure 1A:
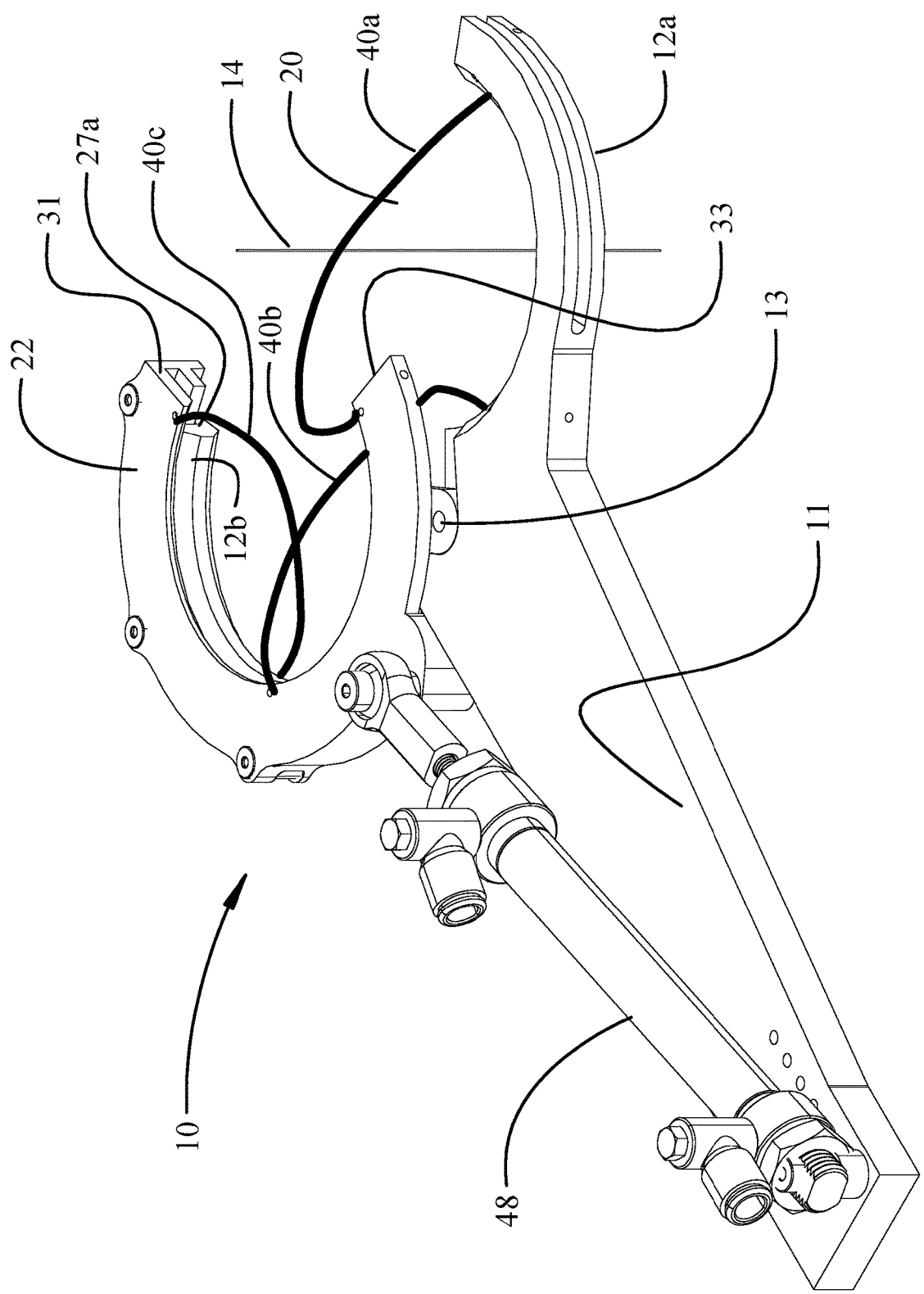
FIG. 1A is a pictorial view of an example of a bundle gripping tool with the jaw in the open position and snare ring unrotated exposing the bundle axis.
Figure 1B:
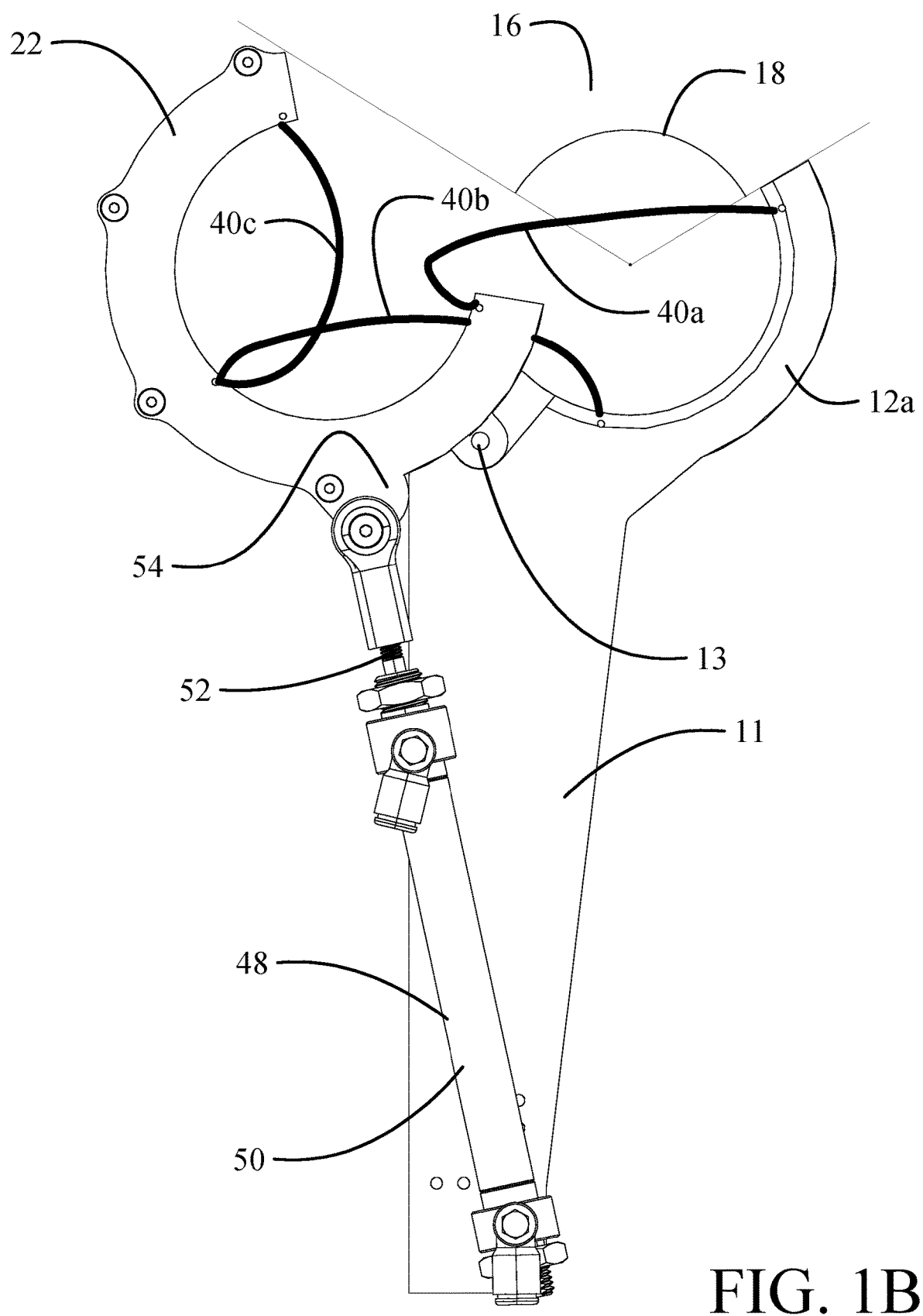
FIG. 1B is a top view of the example in the open position of FIG. 1A.
Figure 2A:
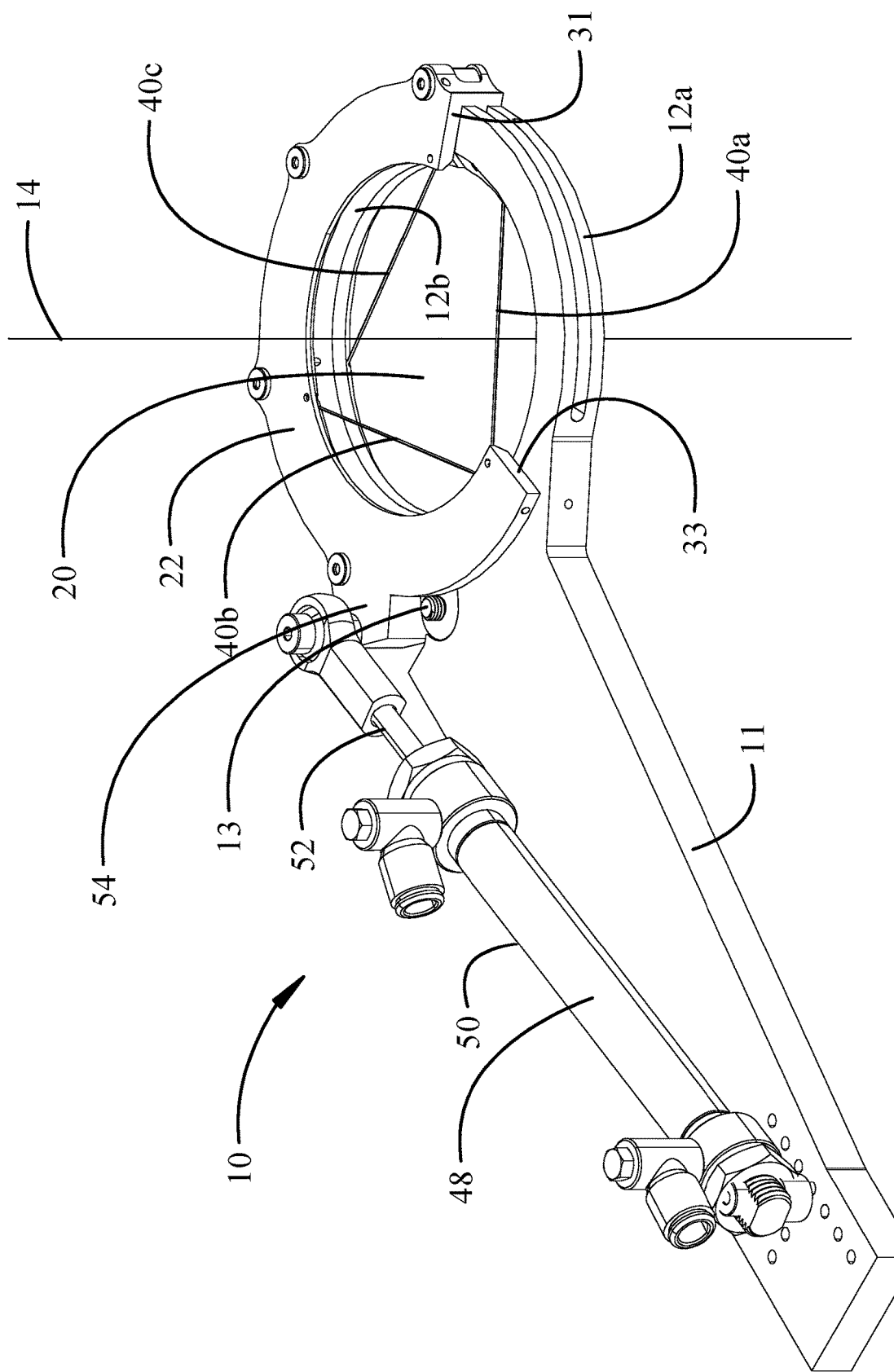
FIG. 2A is a pictorial view of the example with the jaw in the closed position.
Figure 2B:
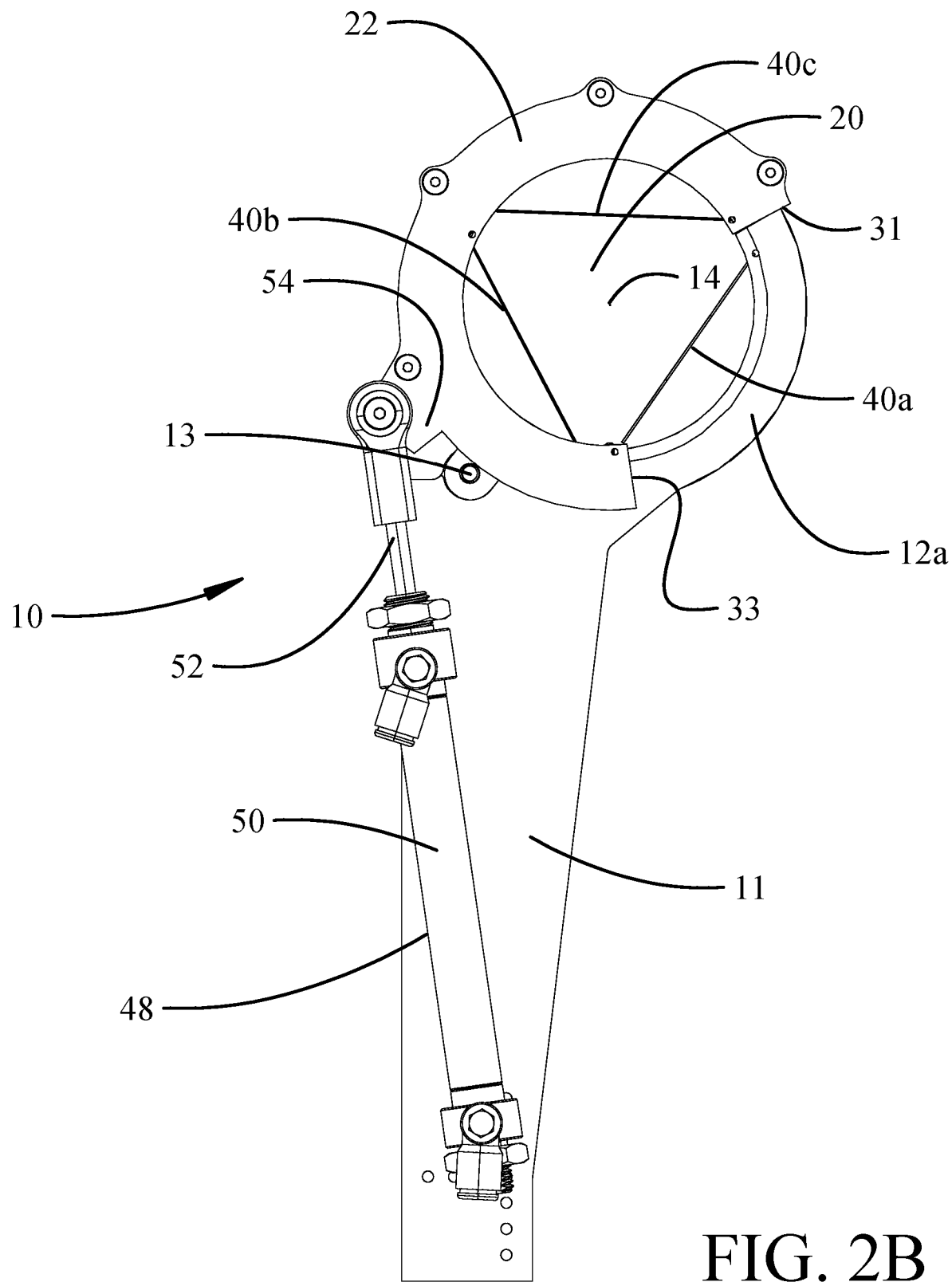
FIG. 2B is a top view of the example in the jaw closed position of FIG. 2A.
Figure 3A:
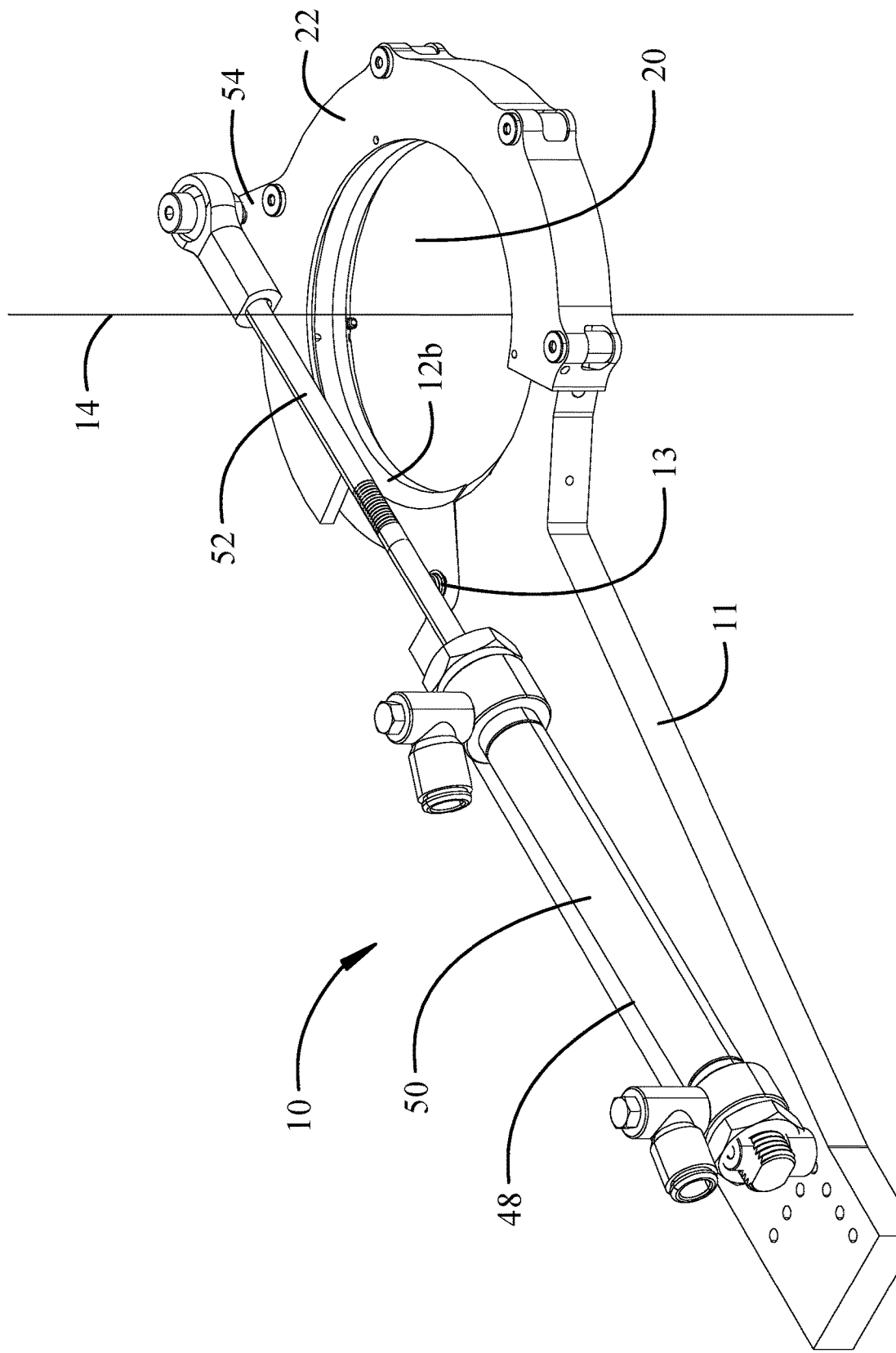
FIG. 3A is a pictorial view of the example with the jaw in the closed position and the snare ring in a fully rotated position.
Figure 3B:
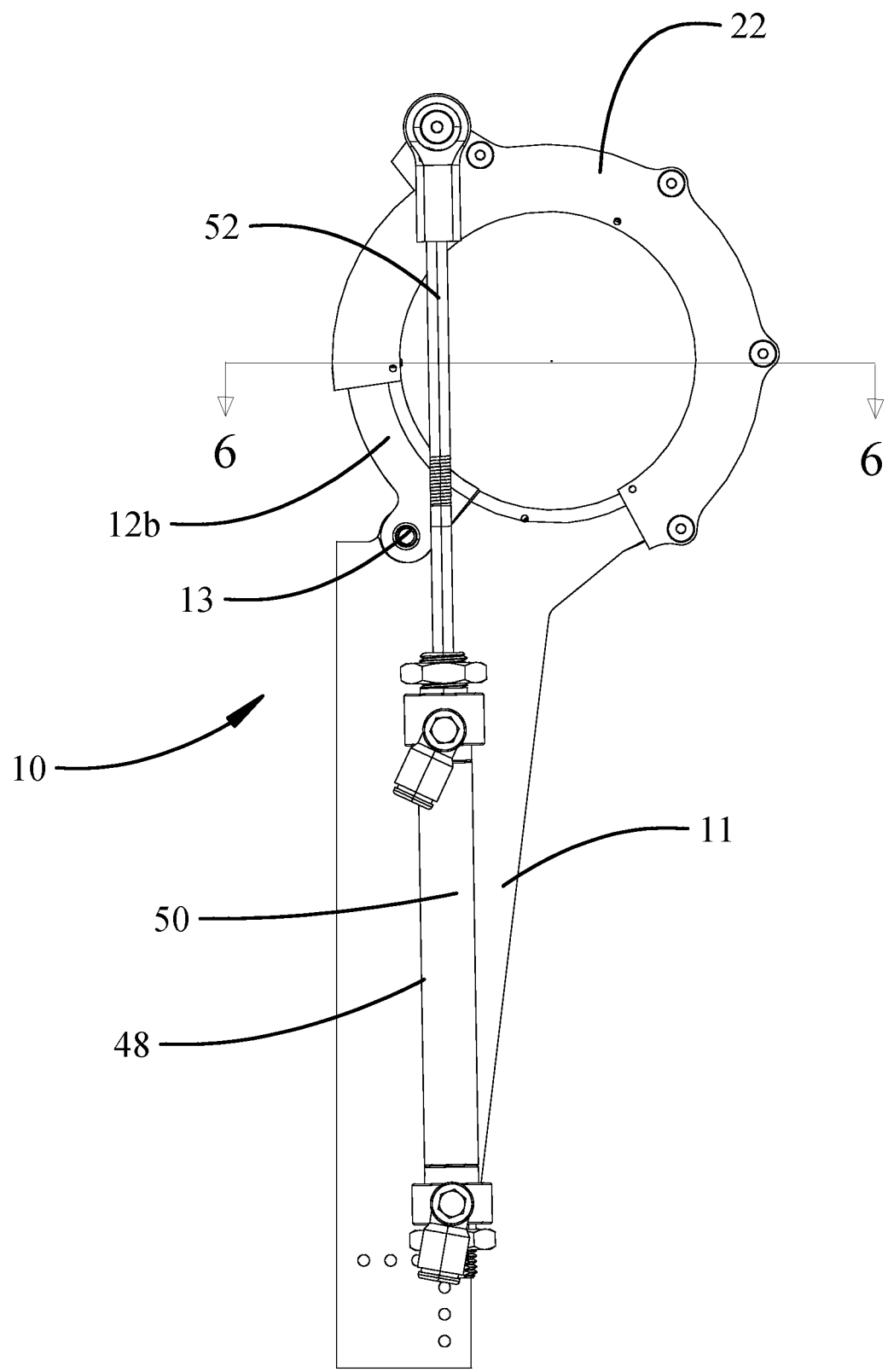
FIG. 3B is a top view of the example with the jaw and the snare ring in the closed position showing a fully rotated position of the snare ring.

The examples described herein provide an adaptive bundle gripping tool for wire bundles, tubing bundles or similar bundled objects, which can be operated as an end effector on a robotic manipulator, a hand held tool, or a mounted retainer system. The examples herein will depict wire bundles as the gripped bundles. Referring to the drawings, FIGS. 1A-3B show a bundle gripping tool 10 having a supporting structure such as a handle 11 with a support ring sector 12a extending from the handle. A semicircular jaw 12b, having a sector diameter 13b equal to a sector diameter 13a of the support ring sector 12a (seen in FIG. 4), is pivotally attached to the handle 11 opposing the support ring sector 12a. A pivot pin 13 rotatably secures the jaw to the handle 11 and the jaw is rotatable from an open position (seen in FIGS. 1A and 1B) to a closed position (seen in FIGS. 2A and 2B). In the closed position, the jaw 12b and support ring sector 12a form a circular support ring, generally designated 12 (best seen in FIG. 4). The support ring 12 surrounds a central aperture 20 concentric with a bundle axis 14. The support ring 12 with the jaw 12b rotated to an open position, as seen in FIGS. 1A and 1B, exposes a first open sector 16 having a first sector angle 18 accessing the central aperture 20 allowing lateral insertion of a wire bundle into the central aperture, as will be described in greater detail subsequently. A snare ring 22 is supported on the jaw 12b in the open position and is rotatable on the support ring 12 in the closed position about and concentric with the bundle axis 14. The snare ring 22 is rotatable through a range of rotated positions from an unrotated position as seen in FIGS. 2A and 2B to a fully rotated position as seen in FIGS. 3A and 3B.

Figure 4:
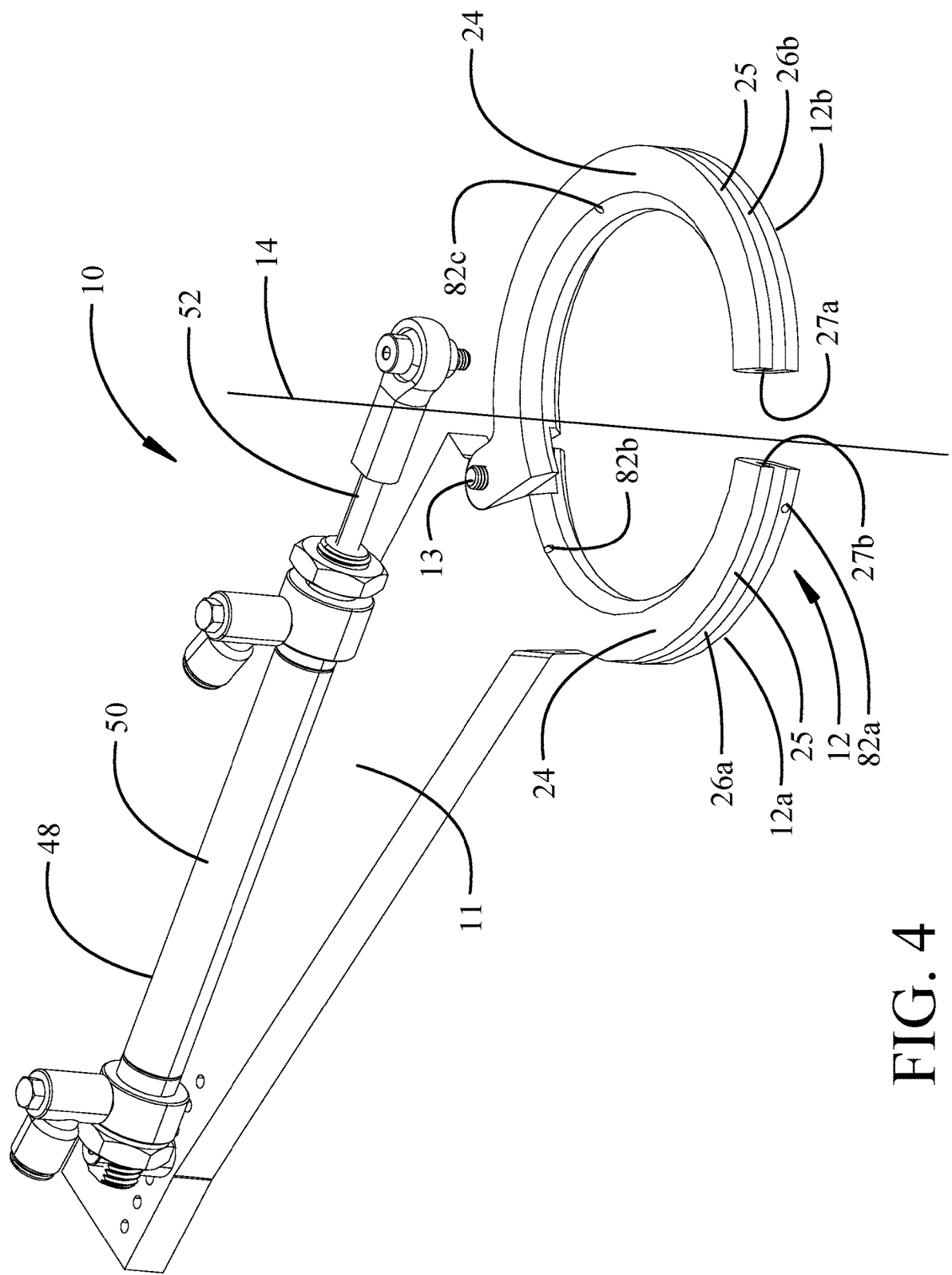
FIG. 4 is a pictorial view with the snare ring removed showing the jaw and support ring sector forming the support ring.
Figure 5:
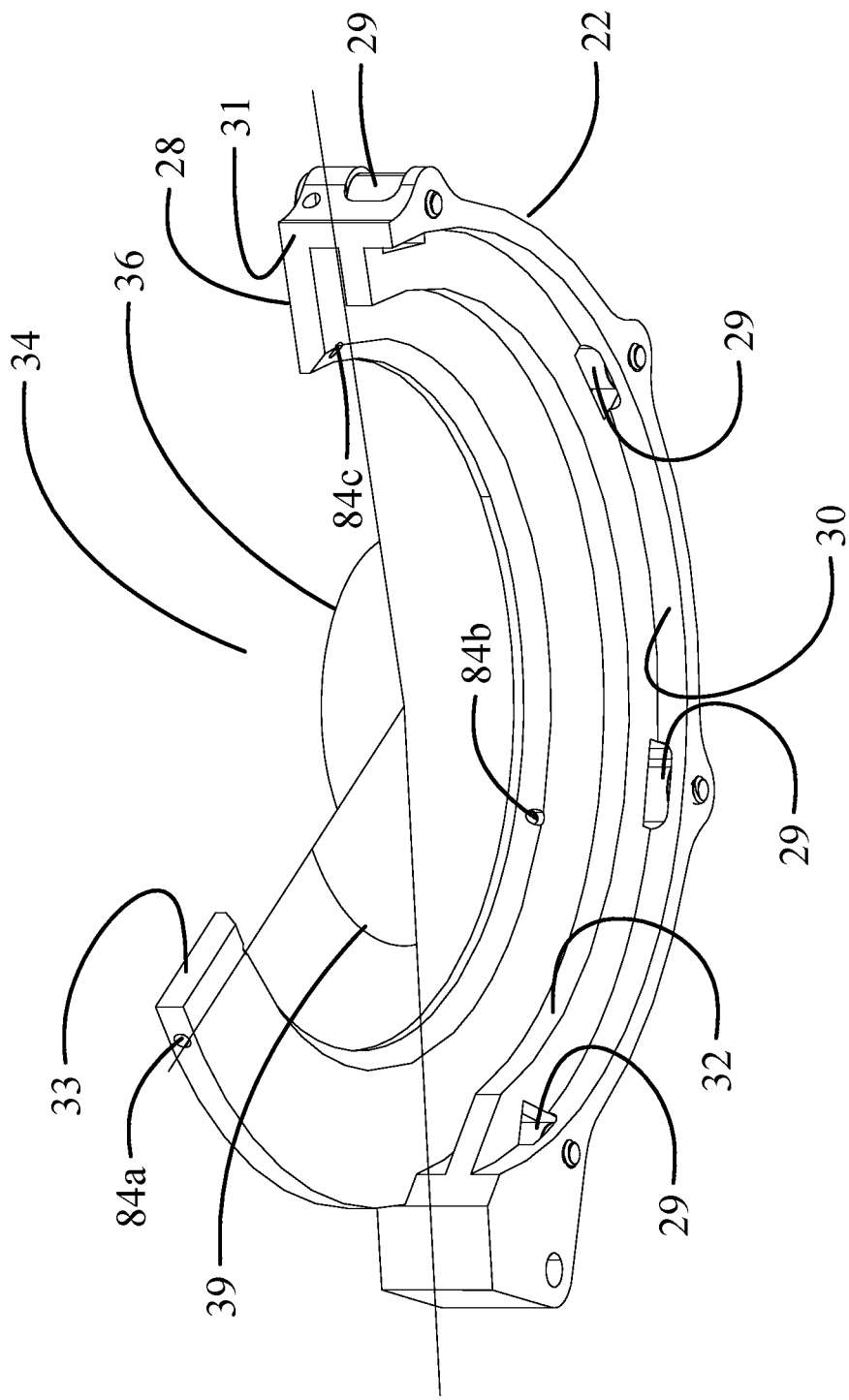
FIG. 5 is a pictorial view of the snare ring unmounted from the support ring.
Figure 6:
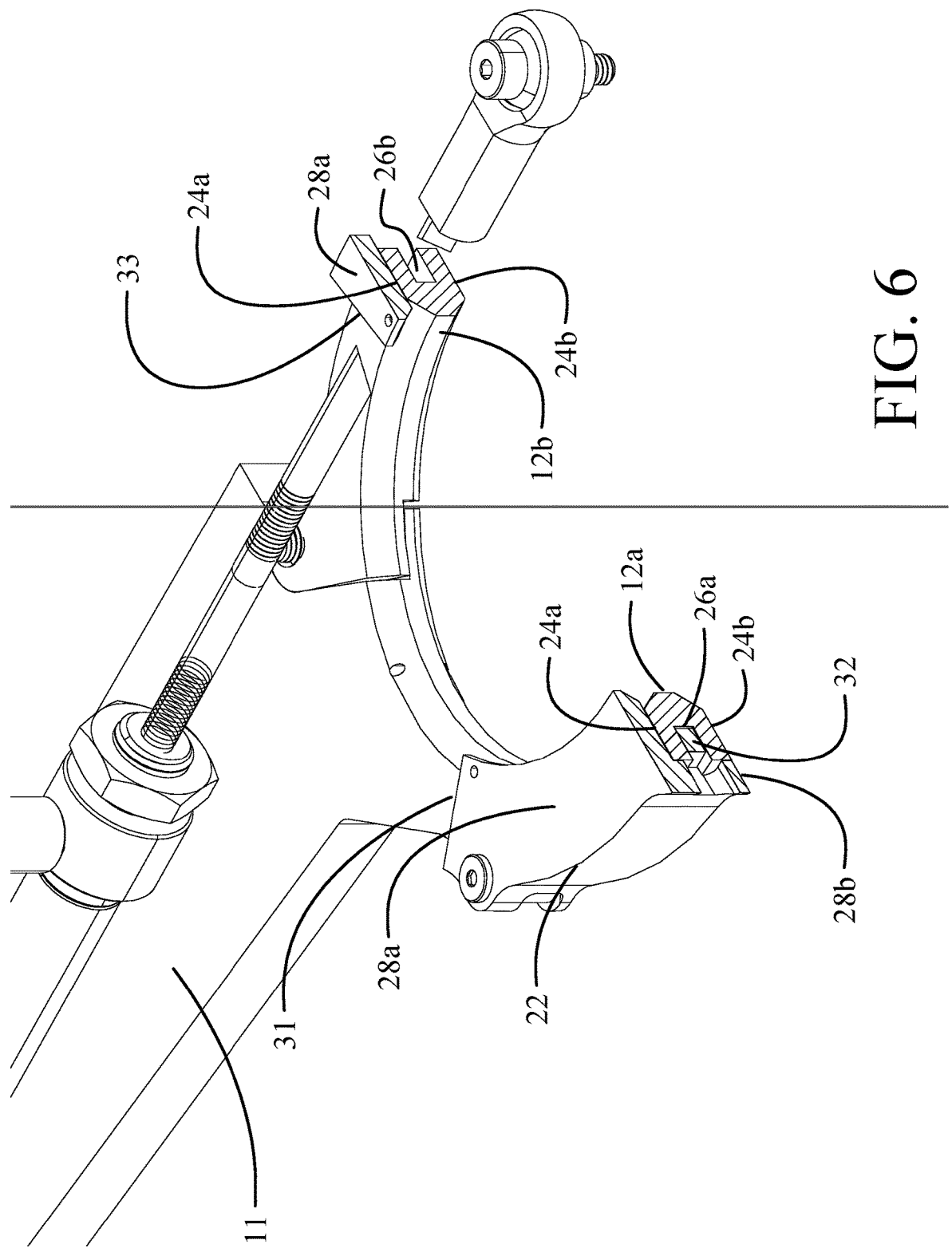
FIG. 6 is a pictorial section view of the example along line 6-6 in FIG. 3B (with the actuator removed) showing the jaw, support ring sector and snare ring profiles in detail.

As seen in FIG. 4, the support ring sector 12a and jaw 12b each have an upper surface 24 and circumferential surface 25. Support ring sector 12a has an outer circumferential slot 26a and jaw 12b has an outer circumferential slot 26b. A face 27a on the jaw 12b engages a mating face 27b on the support ring sector 12a. In the closed position the upper surfaces 24 and circumferential surface 25 and the circumferential slots 26a and 26b of the support ring sector 12a and jaw 12b are aligned. A face 27a (best seen in FIG. 1A) on the jaw 12b engages a mating face 27b on the support ring sector 12a. The snare ring 22, as seen in FIG. 5, has an upper flange 28 extending radially inwardly from a web 30. A guide ring 32 also extends radially inwardly from the web 30. As seen in FIG. 6, the upper flange 28 and web 30 of the snare ring 22 are configured to engage the upper surface 24 and circumferential surfaces 25 of the support ring sector 12a and jaw 12b in sliding contact. Guide ring 32 is received in the slot 26b on the jaw 12b in the unrotated position and additionally engages slot 26a on the support ring sector 12a through the range of rotated positions. For the exemplary embodiment, a plurality of rollers 29 are supported on the snare ring for rolling contact of the circumferential surface 25. The snare ring 22 has a second open sector 34 with a second sector angle 36. The second sector angle 36 is greater than or equal to than the first sector angle 18 to allow access to the central aperture 20 with the jaw 12b in an open position and the snare ring 22 in an unrotated position. In the example the second sector angle is between 115 and 125°. The unrotated position of the snare ring 22 at least partially aligns the second open sector with the first open sector exposing the central aperture 20. The web 30 in snare ring 22 extends from a leading edge 31 and terminates at a third sector angle 39 allowing clearance for the upper flange 28 over the handle 11 with the snare ring to the unrotated position with a trailing edge 33 overlapping a portion of the support ring sector 12a.

Figure 7A:
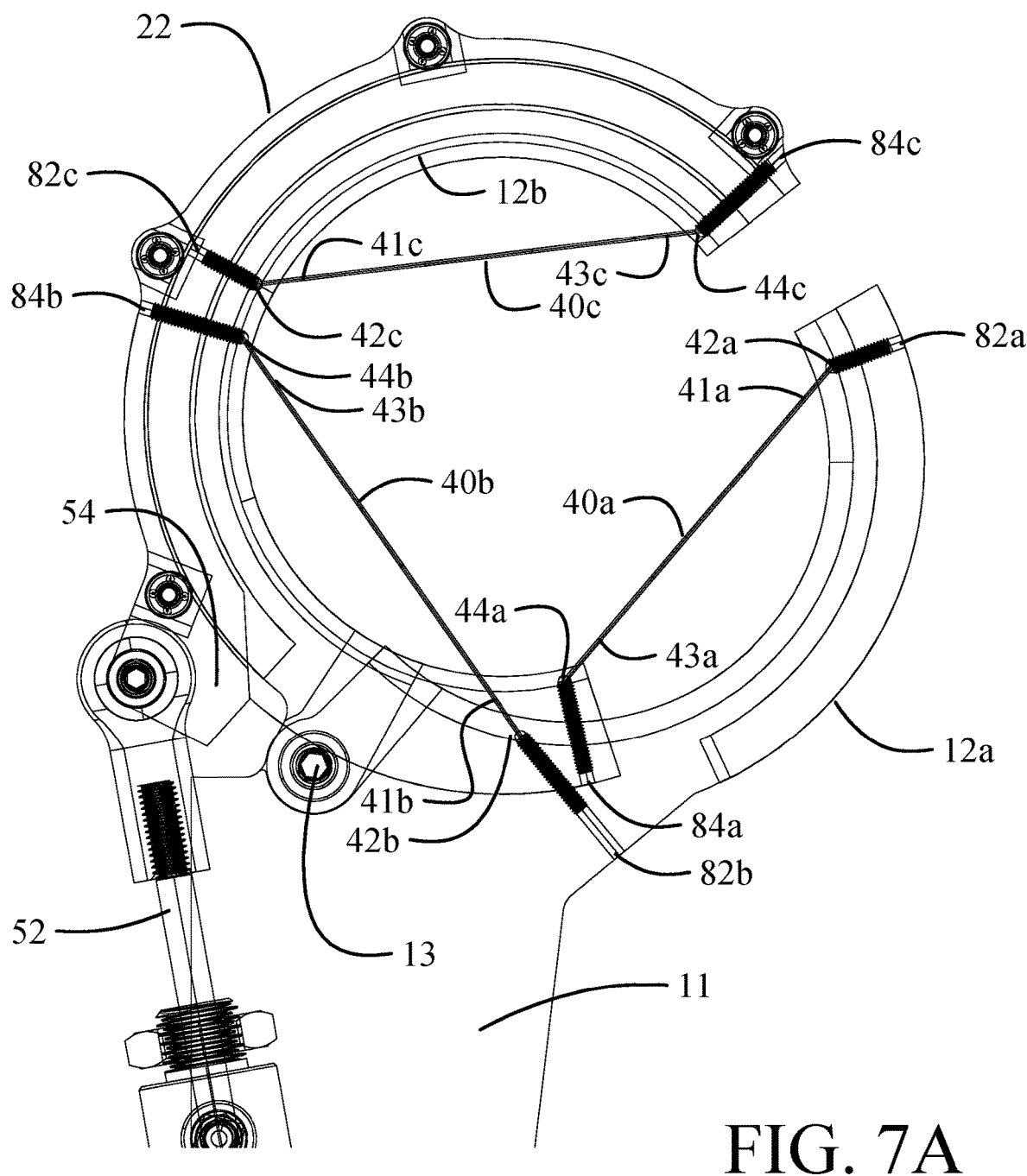
FIG. 7A is a wire-frame detailed partial top view of the structure and configuration of attachment points for the snare cables on the support ring and snare ring in the open position of the jaw and snare ring.
Figure 7B:
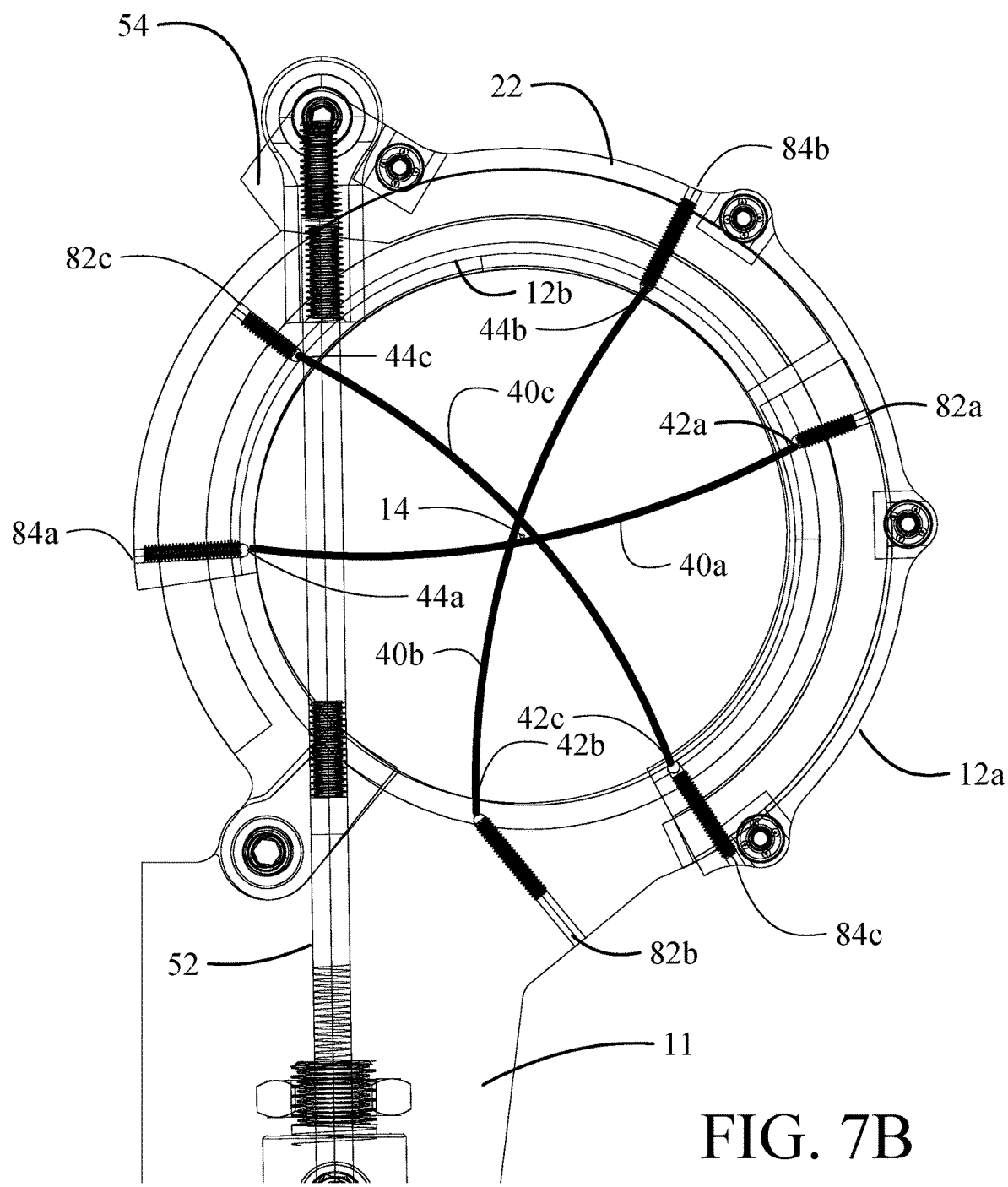
FIG. 7B is a wire-frame detailed partial top view of the structure and configuration of attachment points for the snare cables on the support ring and snare ring in the closed position of the jaw and snare ring FIG. 8 a top view of the example showing the snare cables engaging a wire bundle.
Figure 8:
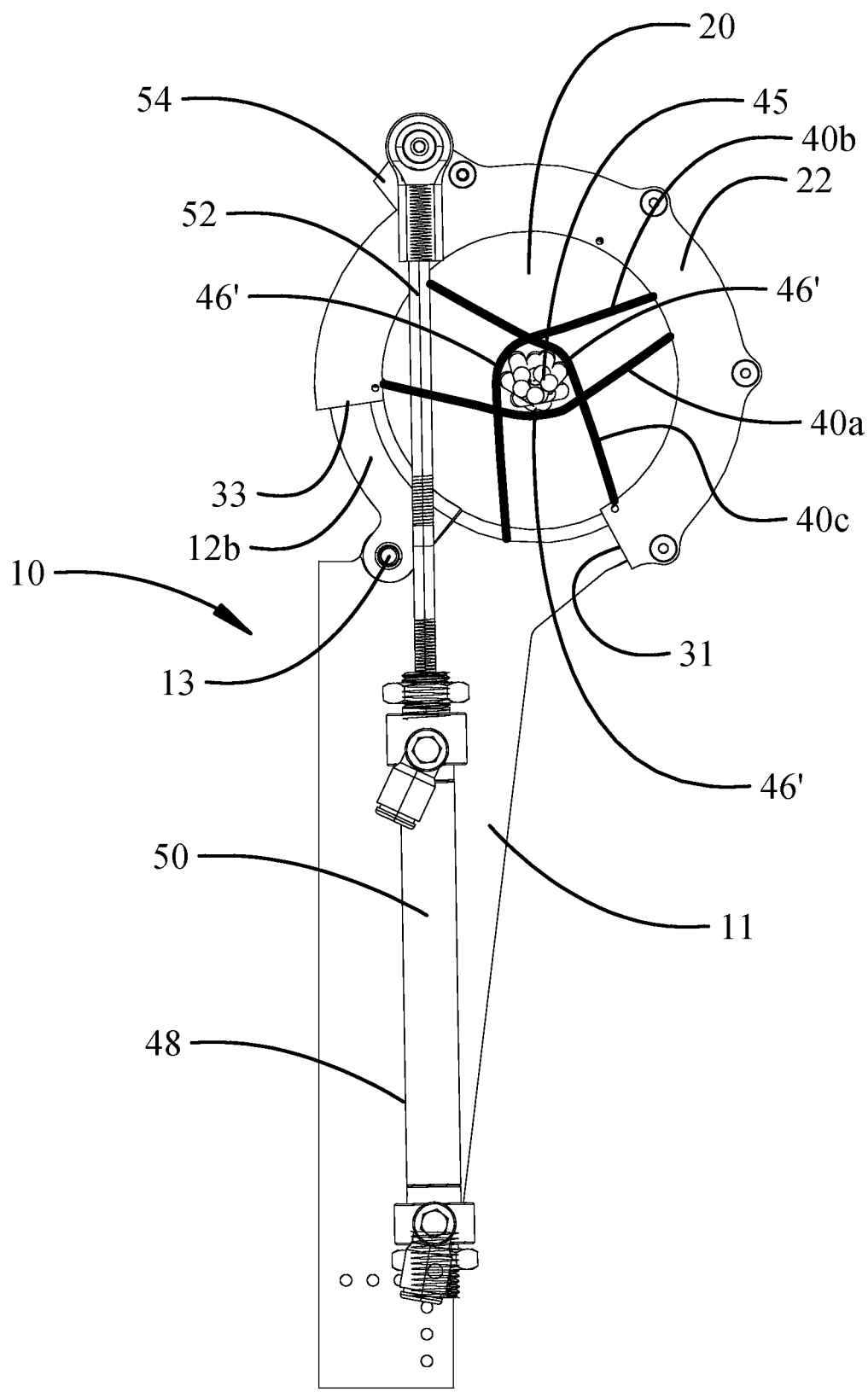

A plurality of snare cables (generally designated 40 and specifically 40a, 40b and 40c, in the example), is engaged at first ends 41a, 41b, 41c to a first set of attachment point 42a, 42b, 42c on the snare ring 22 and at second ends 43a, 43b and 43c, to a second set of attachment points 44a, 44b 44c on the support ring 12 as seen in FIG. 7A with the jaw 12b in the open position and the snare ring 22 in the unrotated position. The first set of attachment points and second set of attachment points are relatively positioned such that the plurality of snare cables partially encircles the bundle axis 14 in the closed position of the jaw 12a as seen in FIG. 2B and exposes the bundle axis 14 to the first open sector 16 with the snare ring 22 in the unrotated position and the jaw 12b in the open position as seen in FIG. 1B thereby allowing lateral insertion of wires in a wire bundle 45 through the first open sector 16 into the central aperture 20. Encirclement and engagement of the wire bundle 45 is furthered by the rotation of the snare ring 22 from the unrotated position through the range of rotation transitions the bight 46 of the snare cables from a straight or slightly loose convex configuration shown in FIGS. 1A and 1B and urges the bight, designated 46', to a concave configuration to ensnare the wire bundle 45 as shown in FIG. 8. Additional rotation, up to the fully rotated position, increases the concavity of the bight 46' which provides multiple benefits. The wires in the wire bundle 45, which are initially loose, are drawn together and consolidated into a bundle. Further, the engagement and tightening of the bights 46' created by the rotation of the snare ring 22 urges the wire bundle 44 to a central position substantially concentric with the bundle axis 14 regardless of initial position within the central aperture 20.

An actuator 48 is configured to open and close the jaw 12b and rotate the snare ring 22. One example a linear actuator rotatably pinned on the handle 11 employs a pneumatic cylinder 50 with an actuating rod 52 pivotally connected to a tab 54 radially extending from the snare ring 22. Initial extension of the actuating rod 52 urges the jaw 12b on which the snare ring 22 is supported from the open position to the closed position. Further extension of the actuating rod 52 induces rotation of the snare ring 22 from the unrotated position to the rotated position. In alternative embodiments an electrically operated linear actuator with a stepper motor or similar electrically powered motor may be employed.

In the example, the first sector angle 18 is in a range of 100 to 130° and nominally 115°. Three snare cables 40a, 40b, 40c are employed with the first set of attachment points 42a, 42b and 42c positioned on the support ring 12 proximate the mating face 27b of the support ring sector 12a, an azimuthal position between 115 and 125° from the mating face and a second azimuthal position between 235 and 245° from the mating face (−115 to −125° from the face 27a of the jaw 12b). The second set of attachment points 44a, 44b, 44c are positioned on the snare ring similarly located proximate the trailing edge 33, an azimuthal position intermediate the trailing edge 33 and leading edge 31 and proximate the leading edge 31. The shape formed by the snare cables when engaged on a cable bundle approximates a Reuleaux Triangle emulating an ideal shape of a circle.

For the example, the first set of attachment points 42a, 42b and 42c employ conduits 82a, 82b and 82c in the support ring 12 with the conduits receiving and constraining first ends 41a, 41b and 41c of the snare cables 40a, 40b and 40c. The second set of attachment points 44a, 44b and 44c employ channels 84a, 84b and 84c in the upper flange 28 of the snare ring 22 with the channels receiving and constraining second ends 43a, 43b and 43c of the snare cables 40a, 40b and 40c. This configuration allows unrestricted closure of the jaw 12b and rotation of the snare ring 22 on the support ring 12.

During operation, after initially condensing the wire bundle 45 in the snare cables 40, the snare ring 22 can be rotated back and forth several times (by about 45 degrees). This semi-circular motion has the benefit of pulling all the contained wires into a more circular form than the initial Reuleaux triangular shape alone. Rotations of a Reuleaux triangle exhibit a substantially circular motion. While the plurality of snare cables 40 equals three in the exemplary embodiment two or more snare cables are employed in alternative embodiments to accommodate varying wire bundle sizes and tensioning requirements.

Figure 9:
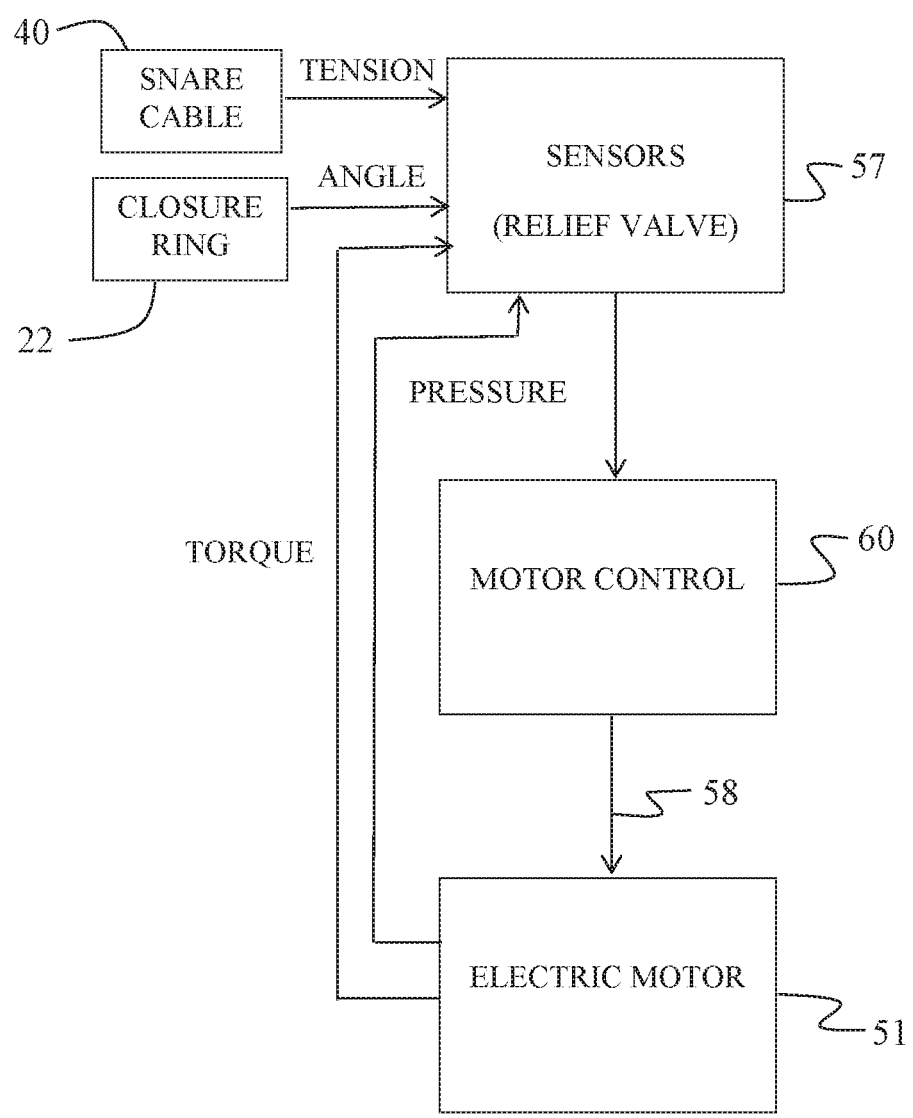
FIG. 9 is a block diagram schematic of a sensor and control system for the actuator to control rotation of the snare ring.

To accommodate varying wire bundle sizes (both number of wires and wire gage) the rotation of the snare ring 22 is controlled to provide a desired tension in the snare cables 40 to consolidate the wire bundle 45. As shown in FIG. 9, for use with the pneumatic actuator implementation a sensor 57 is a relief valve which maintains a predetermined maximum back pressure in the pneumatic cylinder 50 to achieve the desired snare cable tension. For an electrically powered actuator, one or more sensors 57 measuring tension in the snare cables 40 provide a signal received by a motor control 60 which transmits a control signal 58 that stops the electrical motor 51 of the linear actuator at a predetermined tension in the snare cables 40. In certain implementations the sensor 57 is a rotation sensor measuring angular rotation of the snare ring 22 as opposed to actual tension in the snare cables. Alternatively the sensor 57 is a torque sensor measuring torque on the motor 51. Alternative sensors such as optical position sensors or synthetic vision systems may also be employed. The motor control 60 may also receive control parameters such as motor current directly from the motor 51. In certain implementations, the snare cables 40 are elastic to provide a stretching engagement of the wire bundle. As seen in FIGS. 2A, 3A and 8, the closed position has a range of rotation of the snare ring 22 from a contact position of the jaw 12b to block the first open sector 16 (FIG. 2A) to a fully rotated position of the snare ring 22 for compressing a wire bundle with a minimal radius (FIGS. 3A and 8). The sensor 57 determines the rotational stopping position of the snare ring 22.

Figure 10:
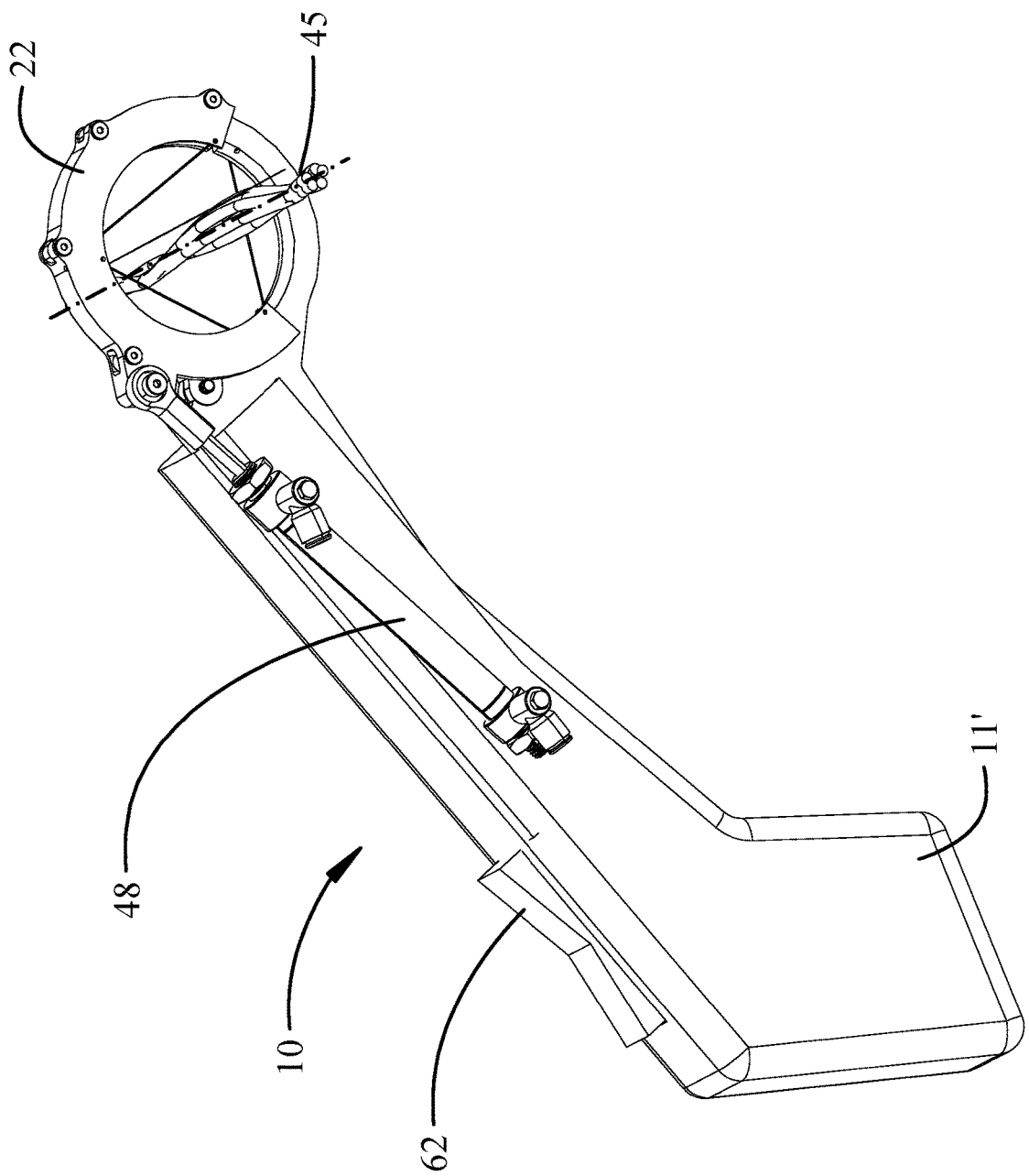
FIG. 10 is an exemplary configuration of the bundle gripping tool as a hand operated tool.
Figure 11:
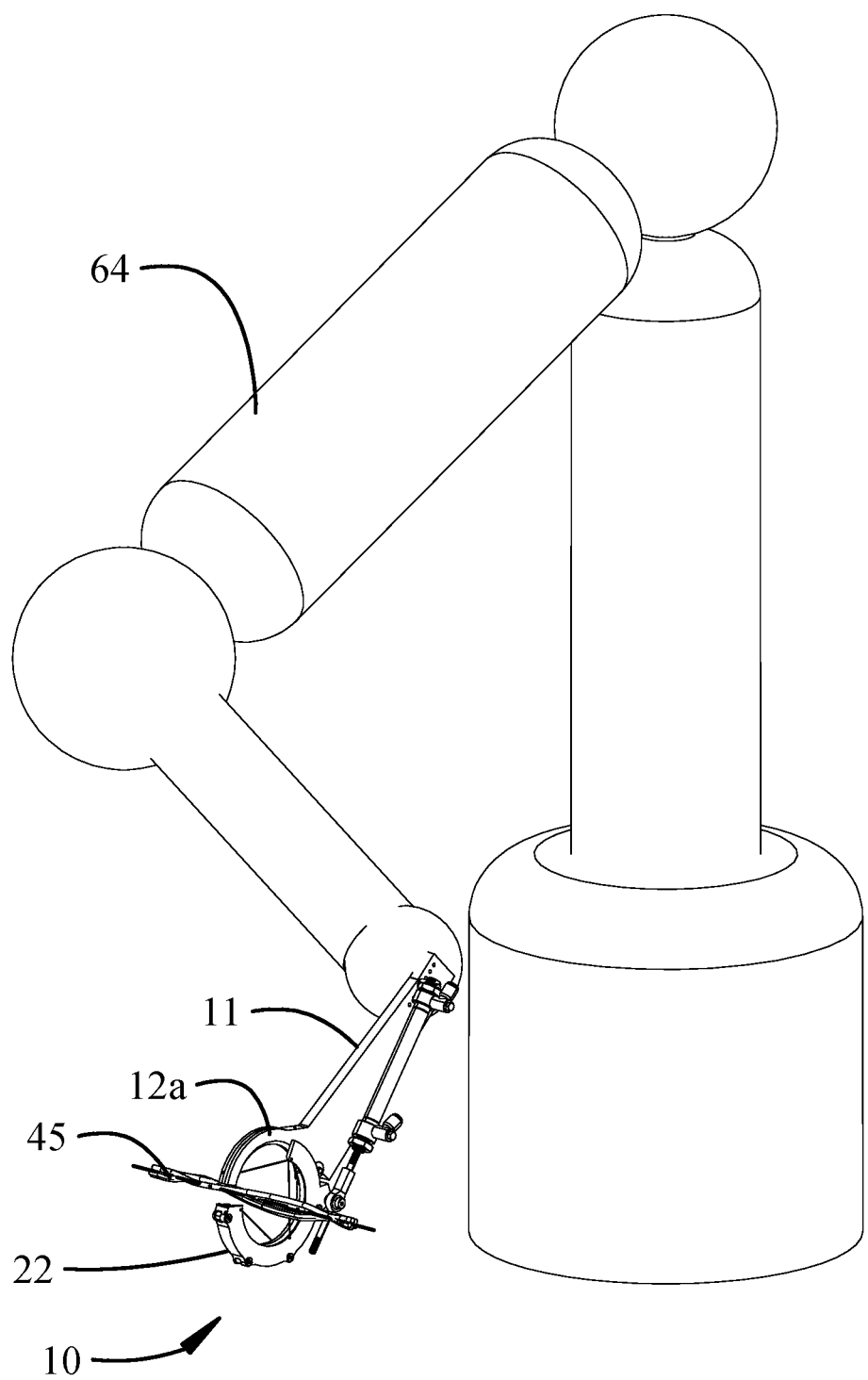
FIG. 11 is an exemplary configuration of the bundle gripping tool as an end effector for a robotic manipulator.
Figure 12:
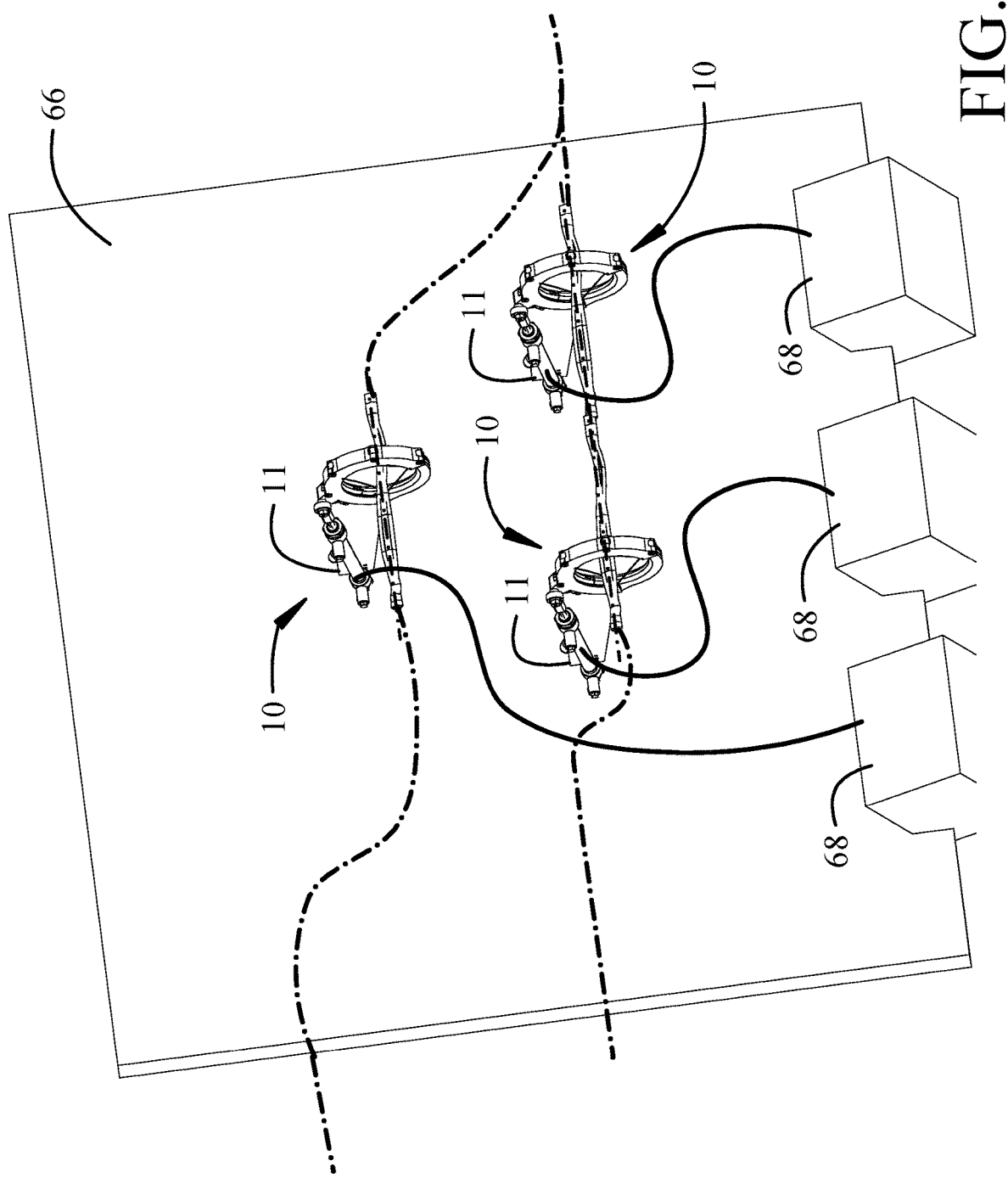
FIG. 12 is an exemplary configuration of the bundle gripping tool as cable support point on a cable harness layout board.
Figure 13:
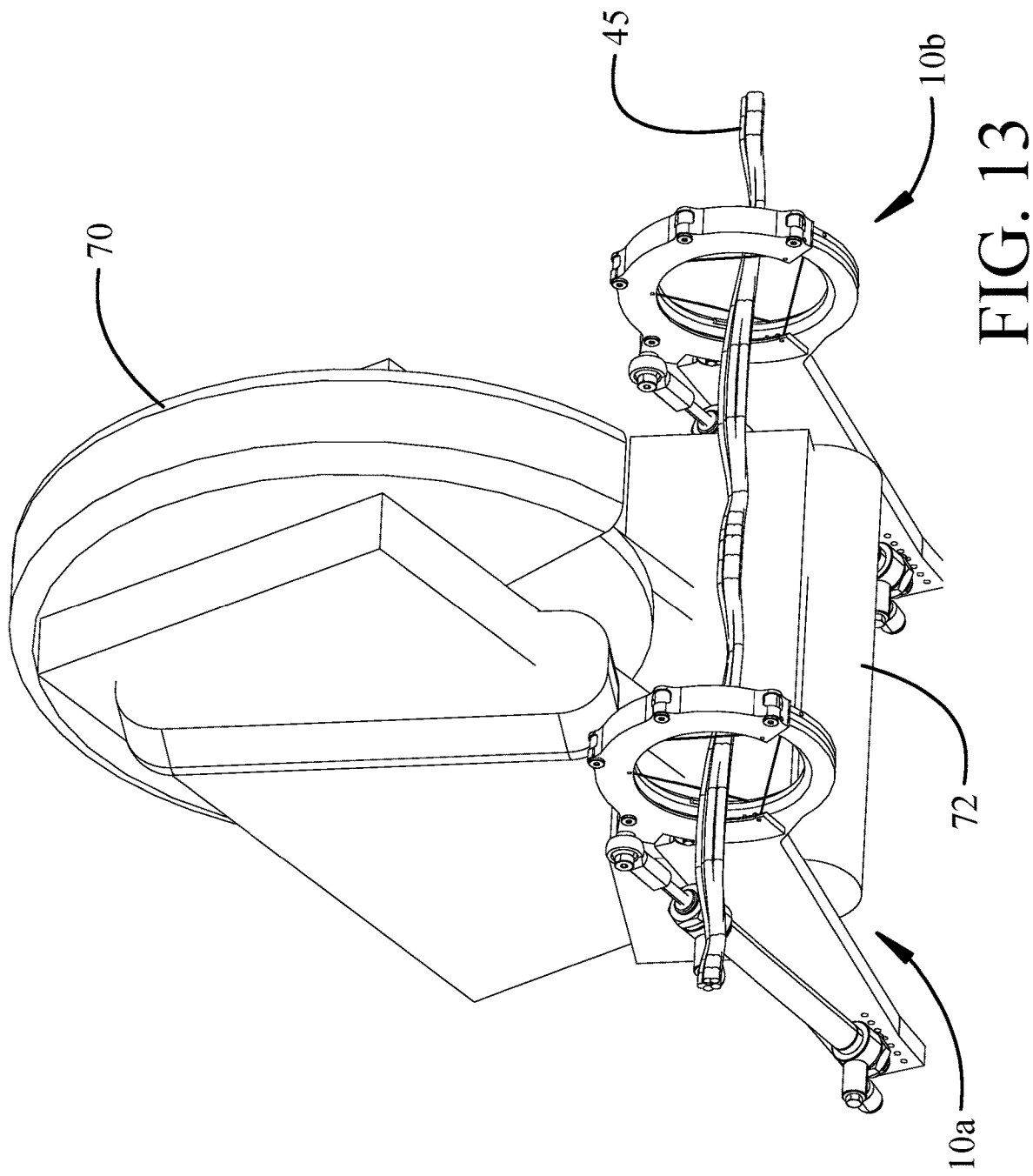
FIG. 13 is an exemplary configuration of the bundle gripping tool in conjunction with a cable cutoff tool; and, FIG. 14 is a flow chart showing a method for operation of an adaptive wire bundle gripping end effector employing the disclosed implementations.

The example of the bundle gripping tool is employable in a number of operational configurations. As seen in FIG. 10, the bundle gripping tool 10 with the handle 11 allows manual positioning and operation of the tool. A trigger or rocker switch 62 mounted on an extended handle 11' is operably connected to the actuator 48 to bi-directionally open and close jaw 12b and rotate the snare ring 22 to engage and disengage the tool from wire bundles 45. Similarly, the bundle gripping tool 10 is operable as an end effector for a robotic manipulator 64 with the handle 11 configured for attachment to the manipulator 64 as seen in FIG. 11. One or more bundle gripping tools 10 are mountable by engaging the handle 11 on a wire harness layout board 66 as shown in FIG. 12. Foot switches 68 or optical sensors on the board 66 connected to actuators 48 are employed to trigger engagement of the tool(s) upon insertion of the wire bundle 45. The bundle gripping tool 10a is combinable with additional wire harness fabrication tools such as a bundle cutter 70 attached to the handle 11 as seen in FIG. 13. A single bundle gripping tool 10a could be used if the bundle cutter 70 is closely aligned with the gripping plane. Alternatively a double bundle gripping tool may be employed with the additional tool 10b added to gently tug the support rings away from each other with a pressure piston 72, thereby urging the wire bundle 45 tight prior to a cutting operation. Alternative fabrication tools such as a binder for the wire bundle 45 may also substituted for the cutter. Such a combination is also operable as an end effector for the robotic manipulator 64.

Figure 14:
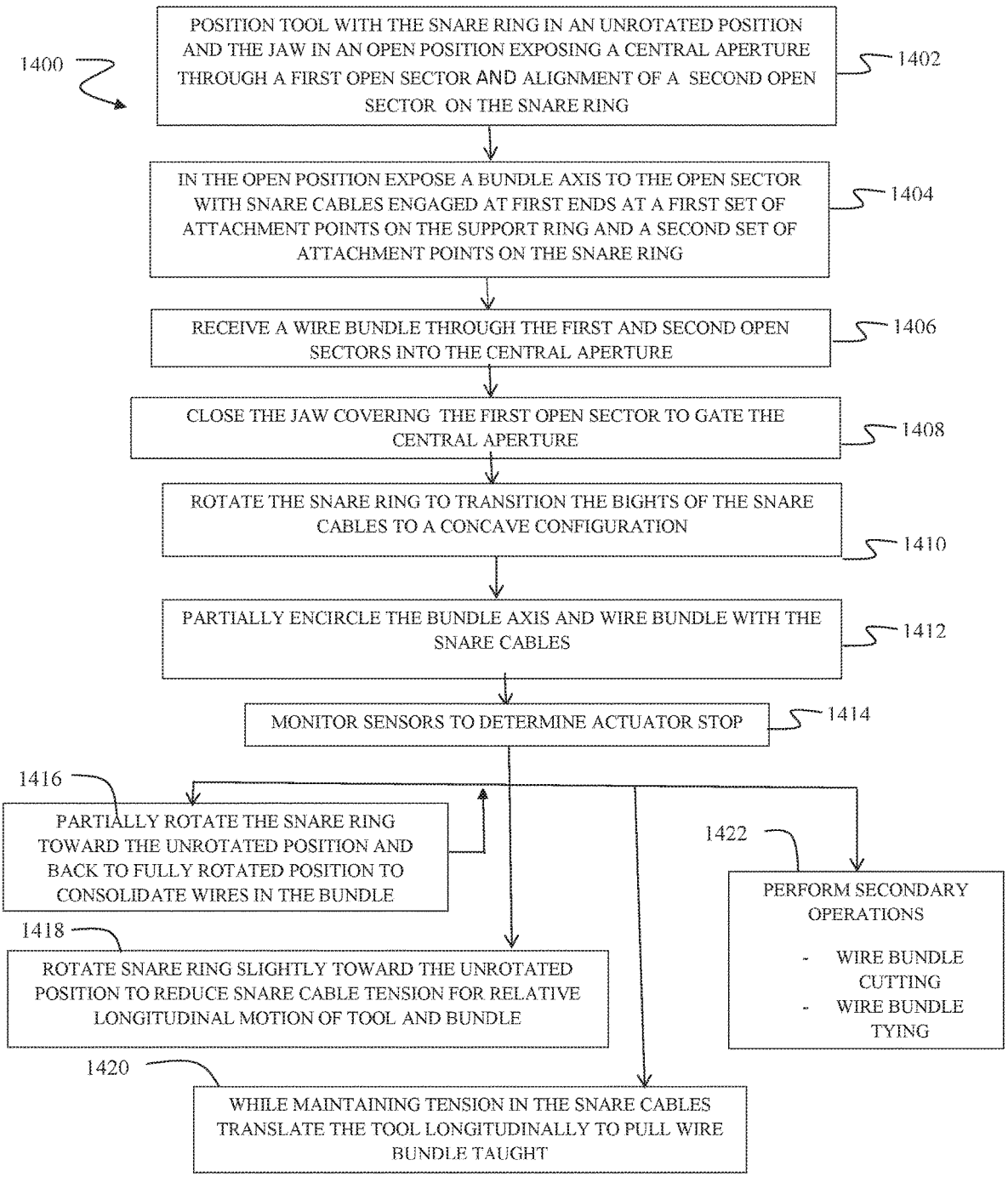

The described implementation for the bundle gripping tool 10 provides a method 1400 for handling of bundles as shown in FIG. 14. A bundle gripping tool 10 having support ring sector 12a extending from a handle 11 and a rotatable jaw 12b opposing the support ring sector forming a support ring 12 in a closed position and a snare ring 22 rotatable on the support ring is positioned with the snare ring in an unrotated position and the jaw 12b in an open position exposing a central aperture 20 through a first open sector 16 and an aligned second open sector 34 on the snare ring, step 1402. In the open position, snare cables 40 engaged at first ends at a first set of attachment points on the support ring and on second ends at a second set of attachment points on the snare ring expose a bundle axis to the open sector, step 1404. A bundle is received through the first and second open sectors into the central aperture, step 1406, either by motion of the tool or insertion of the bundle. An actuator 48 closes the jaw 12b covering the first open sector to gate the central aperture, step; 1408. Rotation of the snare ring from an unrotated position through a range of rotation to a fully rotated position transitions the bights of the snare cables to a concave configuration, step 1410, whereby in the closed position, the snare cables partially encircle the bundle axis and inserted bundle, step 1412. Sensors 57 are monitored for tension in the snare cables 40, pressure, motor torque or rotational position of the snare ring to determine an actuator stop position, step 1414. The snare ring 22 is partially rotated toward the unrotated position and returned to the fully rotated position several times consolidating all the contained wires in the bundle into a more circular form, step 1416. The snare ring 22 may also be rotated slightly toward the unrotated position to allow reduced tension in the snare cables 40 allowing the bundle 45 or bundle gripping tool 10 to slide longitudinally along the bundle axis 14 relative to one another, step 1418. While maintaining tension in the snare cables 40, the bundle gripping tool 10 may be translated longitudinally along the bundle axis 14 with respect to the bundle 45 to pull the bundle taught, step 1420. Secondary operations such as cutting or tying the bundle may also be performed, step 1422.

Having now described various implementations in detail as required by the patent statutes, those skilled in the art will recognize modifications and substitutions to the specific implementations disclosed herein. Such modifications are within the scope and intent of the present invention as defined in the following claims.

What is claimed is:

1. A bundle gripping tool for receiving a cable bundle comprising:
   a support ring sector extending from a handle and a jaw pivotally mounted to the handle opposing the support ring sector, said jaw rotatable from an open position to a closed position wherein the jaw and support ring sector form a circular support ring concentric to a bundle axis, the jaw exposing a first open sector accessing a central aperture in the open position;
   a snare ring supported on the jaw in the open position and rotatable on the support ring in the closed position, the snare ring concentric with and rotatable about the bundle axis to a rotated position, the snare ring having a second open sector wherein in an unrotated position of the snare ring at least partially aligns the second open sector with the first open sector exposing the central aperture;

a plurality of snare cables engaged between a first set of attachment points on the support ring and a second set of attachment points on the snare ring, said first set of attachment points and second set of attachment points relatively positioned whereby each of said plurality of snare cables partially encircles the bundle axis in the closed position and rotated position, and exposes the bundle axis in the unrotated position and open position; and, an actuator configured to open and close the jaw and rotate the snare ring with the jaw in the closed position.

2. The bundle gripping tool as defined in claim 1 wherein the actuator comprises:

a linear actuator having a pneumatic cylinder with an actuating rod pivotally connected to a tab radially extending from the snare ring, whereby initial extension of the actuating rod urges the jaw on which the snare ring is supported from the open position to the closed position and extension of the actuating rod induces rotation of the snare ring from the unrotated position to the rotated position.

3. The bundle gripping tool as defined in claim 2 further comprising at least one sensor determining snare cable tension.

4. The bundle gripping tool as defined in claim 3 wherein the sensor comprises a relief valve maintaining a maximum back pressure.

5. The bundle gripping tool as defined in claim 2 further comprising:

a switch 62 mounted on the handle and operably connected to the actuator to bi-directionally open and close the jaw and rotate the snare ring to engage and disengage the tool from wire bundles.

6. The bundle gripping tool as defined in claim 2 wherein the handle is configured for attachment to a robotic manipulator.

7. The bundle gripping tool as defined in claim 2 further comprising a bundle cutter attached to the handle.

8. The bundle gripping tool as defined in claim 1 wherein the actuator employs an electrically powered motor and at least one sensor measures tension in at least one of the plurality of snare cables.

9. The bundle gripping tool as defined in claim 1 wherein the actuator employs an electrically powered motor and at least one sensor measures torque on the motor.

10. The bundle gripping tool as defined in claim 1 wherein the actuator employs an electrically powered motor and at least one sensor measures angular rotation of the snare ring.

11. The bundle gripping tool as defined in claim 1 wherein the support ring sector and jaw each have an upper surface and a circumferential surface and the snare ring comprises:

an upper flange extending radially inwardly from a web, the upper flange and web configured to engage upper surfaces and circumferential surfaces of the support ring sector and jaw in sliding contact.

12. The bundle gripping tool as defined in claim 11 wherein the support ring sector has an outer circumferential first slot and the jaw has an outer circumferential second slot and the snare ring further comprises a guide ring extending radially inwardly from the web and engaging the second slot in the unrotated position and first slot in a range of rotated positions.

13. The bundle gripping tool as defined in claim 12 wherein the actuator is pivotally connected to a tab extending from the snare ring.

14. The bundle gripping tool as defined in claim 11 wherein the first set of attachment points comprise conduits in the support ring, said conduits receiving and constraining first ends of the snare cables.

15. The bundle gripping tool as defined in claim 11 wherein the second set of attachment points comprise channels in the upper flange of the snare ring, said channels receiving and constraining second ends of the snare cables.

16. The bundle gripping tool as defined in claim 1 wherein a first sector angle of the first open sector is between 100 and 130°.

17. The bundle gripping tool as defined in claim 16 wherein a second sector angle of the second open sector is in a range of 115 to 125°.

18. The bundle gripping tool as defined in claim 17 wherein the plurality of snare cables comprises three snare cables 40a, 40b, 40c and the first set of attachment points are positioned on the support ring proximate a mating face of the support ring sector, an azimuthal position between 115 and 125° from the mating face and a second azimuthal position between 235 and 245° from the mating face; and the second set of attachment points are positioned on the snare ring proximate the trailing edge, an azimuthal position intermediate the trailing edge and a leading edge and proximate the leading edge.

19. A method for handling of wire bundles comprising:
positioning a bundle gripping tool having a support ring with a jaw and a rotatable snare ring with the jaw in an open position and the snare ring in an unrotated position exposing a central aperture through a first open sector of the support ring;

exposing a bundle axis in the open position with snare cables engaged at first ends at a first set of attachment points on the support ring and on second ends at a second set of attachment points on the snare ring;

inserting a bundle through the first open sector into the central aperture;

closing the jaw and rotating the snare ring with an actuator through a range of rotation to a rotated position to gate the central aperture;

transitioning bights of the snare cables with rotation of the snare ring to a concave configuration; and partially encircling the bundle axis and inserted bundle with the snare cables in the rotated position.

20. The method of claim 19 further comprising:
partially rotating the snare ring toward an unrotated position; and returning the snare ring to the rotated position consolidating all contained wires in the bundle into a more circular form.

* * * * *